(12) United States Patent
Donaldson et al.

(10) Patent No.: US 9,158,045 B1
(45) Date of Patent: Oct. 13, 2015

(54) STABILIZATION OF A HELIOSTAT OUTPUT MIRROR USING AN INERTIAL REFERENCE BEAM

(71) Applicant: The Boeing Company, Chicago, IL (US)

(72) Inventors: Jed Eden Donaldson, Bernalillo, NM (US); Bruce Edward Stribling, Albuquerque, NM (US); Kirk Alan Lohnes, Bosque Farms, NM (US); David Roy Dean, Placitas, NM (US)

(73) Assignee: The Boeing Company, Chicago, IL (US)

( * ) Notice: Subject to any disclaimer, the term of this patent is extended or adjusted under 35 U.S.C. 154(b) by 302 days.

(21) Appl. No.: 13/916,368

(22) Filed: Jun. 12, 2013

(51) Int. Cl.
  *G02B 5/08* (2006.01)
  *G02B 5/10* (2006.01)
  *H04N 5/232* (2006.01)
(52) U.S. Cl.
  CPC . *G02B 5/08* (2013.01); *H04N 5/232* (2013.01)
(58) Field of Classification Search
  CPC ............ Y02E 10/47; Y02E 10/40; F24J 2/38; F24J 2/5417; F24J 2/5431; G01S 3/7861
  USPC .................................................. 359/840, 853
  See application file for complete search history.

(56) References Cited

U.S. PATENT DOCUMENTS

| 3,446,980 | A | 5/1969 | Meier |
| 3,518,016 | A | 6/1970 | Burdin et al. |
| 3,612,634 | A | 10/1971 | Moore, Jr. |
| 3,951,510 | A | 4/1976 | Lloyd |
| 5,027,047 | A | 6/1991 | Logan et al. |
| 2006/0060188 | A1* | 3/2006 | Hickerson ...................... 126/680 |
| 2009/0249787 | A1* | 10/2009 | Pfahl et al. ................. 60/641.11 |

OTHER PUBLICATIONS

Luniewicz et al., "Testing the inertial pseudo star reference unit," Society of Photo-Optical Instrumentation Engineers (SPIE), Acquisition, Tracking, and Pointing VIII, Conference vol. 2221, Jul. 1994, pp. 638-649.
Walter et al., "Stabilized Inertial Measurement System (SIMS)," Society of Photo-Optical Instrumentation Engineers (SPIE), Laser Weapons Technology III, Conference vol. 4724, Jun. 2002, pp. 57-68.

(Continued)

*Primary Examiner* — Stephone B Allen
*Assistant Examiner* — Rahman Abour
(74) *Attorney, Agent, or Firm* — Yee & Associates, P.C.

(57) ABSTRACT

A heliostat including a mirror configured to reflect light directed towards a first surface of the mirror, the light being external to the heliostat, the first surface being opposite a second surface of the mirror. A control mechanism is connected to the mirror and configured to change at least two angles of the mirror. An inertial reference unit is in communication with the control mechanism and configured to produce a beam and use the beam to optically sample the second surface of the mirror, the beam at least reflecting from the second surface. The control mechanism is configured to use data from the beam and the inertial reference unit to control the least two angles such that a virtual beam from the inertial reference unit remains about co-aligned with a line of sight vector of the mirror when the heliostat is subjected to an exogenous disturbance.

20 Claims, 6 Drawing Sheets

(56) References Cited

OTHER PUBLICATIONS

Merritt et al., "Beam control for high-energy laser devices," Society of Photo-Optical Instrumentation Engineers (SPIE), Optical Engineering, vol. 52, No. 2, Feb. 2013, pp. 021005-1-021005-10.

Friel et al., "Vibration Evaluation of a Precision Inertial Reference Unit," Society of Photo-Optical Instrumentation Engineers (SPIE), Acquisition, Tracking, Pointing, and Laser Systems Technologies XXI, Conference vol. 6569, May 2007, pp. 65690U-1-65690U-11.

Deyoung et al., "Beam control system for an airborne laser radar," Society of Photo-Optical Instrumentation Engineers (SPIE), Gas, Chemical, and Electrical Laser and Intense Beam Control and Applications, Conference 3931, May 2000, pp. 311-320.

Tack, "Cast Glance Near Infrared Imaging Observations of the Space Shuttle During Hypersonic Re-entry," Proceedings of the 48th AIAA Aerospace Sciences Meeting Including the New Horizons Forum and Aerospace Exposition, AIAA 2010-243, Jan. 2010, 14 pages.

"NP-3D Orion," GlobalSecurity.org, dated Jul. 7, 2011, 3 pages. Accessed Jun. 12, 2013, http://www.globalsecurity.org/military/systems/aircraft/p-3-np.htm.

* cited by examiner

STABILIZATION OF A HELIOSTAT OUTPUT MIRROR USING AN INERTIAL REFERENCE BEAM

BACKGROUND INFORMATION

1. Field

The present disclosure relates generally to stabilization of heliostat mirrors.

2. Background

A heliostat mirror is an astronomical instrument used to reflect the light of the sun, or possibly some other light or energy source, in a constant direction. A heliostat mirror may be the primary component in a reflective optical architecture that can be found in many applications including astronomy, solar power collection, and imaging systems.

An issue confronted by heliostat mirror systems is how stabilize a light beam's propagation or imaging path when the heliostat system is undergoing one or more exogenous disturbances. The disturbances may arise due to many sources, including platform motion (including vehicle motion if the heliostat system is mounted on a vehicle), associated rigid body and structural dynamics of the heliostat system, target motion, atmospheric dynamic effects on an optical line of sight, and possibly many other sources of exogenous disturbances. Therefore, it would be desirable to have a method and apparatus that takes into account at least some of these issues, as well as other possible issues.

SUMMARY

The illustrative embodiments provide for a heliostat. The heliostat includes a mirror configured to reflect light directed towards a first surface of the mirror, the light being external to the heliostat, the first surface being opposite a second surface of the mirror. The heliostat further includes a control mechanism connected to the mirror and configured to change at least two angles of the mirror. The heliostat further includes an inertial reference unit in communication with the control mechanism and configured to produce a beam and use the beam to optically sample the second surface of the mirror, the beam at least reflecting from the second surface. The control mechanism is configured to use data from the beam and the inertial reference unit to control the least two angles such that a virtual beam from the inertial reference unit remains about co-aligned with a line of sight vector of the mirror when the heliostat is subjected to an exogenous disturbance. The virtual beam may be an imaginary beam from the inertial reference unit that would have been present had the beam passed straight through the mirror instead of being reflected.

The illustrative embodiments also provide for heliostat system including a frame. The heliostat system also includes a mirror connected to the frame and configured to reflect light in a first frequency range that is directed towards a first surface of the mirror, the light being external to the heliostat, the first surface being opposite a second surface of the mirror, the mirror further including a first portion of the second surface that is reflective with respect to a second frequency range different than the first frequency range, the mirror further including a second portion of the second surface that is about transparent to the second frequency range. The first surface is about transparent to the second frequency range but about reflective in the first frequency range. The heliostat system also includes an inertial reference unit connected the mirror by a suspension mechanism that allows the inertial reference unit to move in a first reference frame that is about inertial relative to a second reference frame of the mirror, the inertial reference unit further configured to direct a beam of light of the second frequency range towards the first portion of second surface, the inertial reference unit configured to point a virtual beam towards a target, the virtual beam comprising the beam had the beam not been reflected from the second surface. The heliostat system also includes a corner cube reflector connected to the frame and configured to receive the beam after being reflected from the first portion, the corner cube reflector further configured to reflect the beam back towards the second portion of the second surface. The heliostat system also includes a first reflector connected to the frame and configured to receive the beam after the beam passes through the mirror. The heliostat system also includes a second reflector connected to the frame and configured to receive the beam after the beam reflects off of the first reflector. The heliostat system also includes a third reflector connected to the frame and configured to receive the beam after the beam reflects off of the second reflector, The first reflector, second reflector, and third reflector are further configured to act as a beam expander from a smaller beam space to a larger beam space. The heliostat system also includes a fast steering mirror connected to the frame and configured to receive the beam after the beam reflects off of the third reflector. The heliostat system also includes a splitter connected to the frame and configured to receive the beam after the beam reflects off of the fast steering mirror. The heliostat system also includes a position sensing device connected to the frame and configured to receive a third portion of the beam from the splitter. The heliostat system also includes a track camera connected to the frame and configured to receive a fourth portion of the beam from the splitter.

The illustrative embodiments also provide for a method executed in a heliostat. The method includes reflecting light directed towards a first surface of a mirror mounted to a frame of the heliostat, the light being external to the heliostat, the first surface being opposite a second surface of the mirror. The method also includes optically sampling the second surface by directing a beam from an inertial reference unit towards the second surface, the inertial reference unit being in communication with the control mechanism and mounted to the mirror by a suspension mechanism. The method also includes controlling least two angles of the mirror using data from the beam and the inertial reference unit such that a virtual beam from the inertial reference unit remains about co-aligned with a line of sight vector of the mirror when the heliostat is subjected to an exogenous disturbance. The virtual beam may be an imaginary beam from the inertial reference unit that would have been present had the beam passed straight through the mirror instead of being reflected.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account the issues described above with respect to stabilizing heliostat systems. Stabilizing heliostat systems may be especially difficult when a heliostat system is mounted on a vehicle, such as an aircraft or automobile. If the vibrations of the vehicle are relatively large with respect to an inertial reference frame of the vehicle, then accurately pointing a heliostat system may be difficult or impractical.

The illustrative embodiments also recognize and take into account that, prior to this disclosure, no heliostat system could maintain a line of sight in an inertial frame of reference with respect to a frame for mounting the heliostat system, or with respect to a vehicle to which the frame is attached. As used herein, the term "inertial reference frame" means a frame of reference that describes time and space homogenously, isotropically, and in a time-independent manner. Thus, for example, an inertial reference frame may also be considered to be a frame that is not moving with respect to objects within the inertial reference frame.

The illustrative embodiments also recognize and take into account that prior heliostat stabilization systems were bulky or only stabilized a line of sight of the heliostat system down a borehole of the heliostat system, as opposed to an inertial frame for the heliostat system. Still further, the illustrative embodiments also recognize and take into account that prior heliostat stabilization systems suffer from feed-forward errors due to inertial sensor scale factor errors, alignment and orthoganality errors, and unwarranted assumptions of structural rigidity of all associated beam transfer optics.

As mentioned above, a heliostat mirror is a primary component in a number of reflective optical architectures that can be found in many applications including astronomy, solar power collection, and imaging systems. Several schemes exist to stabilize a heliostat mirror; however, each suffers from flaws such as those described above. These flaws make mounting a heliostat system onto a vehicle impractical.

Outside of the art of heliostats, for use in laser systems, inertial reference units (IRUs) have been used to stabilize the output vector of a laser beam. An inertial reference unit is a relatively obscure device employed primarily in laser applications. Recent advances in inertial sensor technology and digital signal processing have allowed the miniaturization of the inertial reference unit over previous generations of such devices.

The illustrative embodiments combine a heliostatic large angle output mirror with an optical inertial reference unit to stabilize a beam propagation path, or imaging path, undergoing exogenous disturbances. On vehicles, such disturbances arise due to platform vehicle motion and associated rigid body and structural dynamics as well as target motion. Exogenous disturbances can also be attributed to atmospheric dynamic effects on the optical line of sight of the heliostat system.

In an illustrative embodiment, an inertial reference unit may optically sample the rear surface of a main mirror of the heliostat system, thereby avoiding a large obscuration of the line of sight of the mirror. The beam transfers through a transparent or semi-transparent portion of the main mirror to co-align with the line of sight vector reflected from the front surface of the main mirror.

As used herein, the term "line of sight vector" refers to a coordinate-defined vector that lies along the line of sight of the heliostat mirror. For this reason, as used herein, the term "line of sight" may be used synonymously with "line of sight vector."

Jitter data arising may be gathered from the beam from the inertial reference unit. The jitter data may arise from disturbances along the entire optical path of the beam. In essence, the beam contains information on the changes in optic orientations of the optics in the path of the beam, the changes arising from the exogenous disturbances. Each succeeding optic in the path superimposes its own changes on the beam relative to the prior optic in the path.

The illustrative embodiments recognize and take into account the unique line of sight geometry of dynamic target engagement using a heliostatic mirror. Thus, the illustrative embodiments provide for mechanization of the inertial reference unit in such a way as to allow sampling and correction of the beam path dynamics over large angle engagement geometries. This feature is a unique geometry because the line of sight vector of the main mirror migrates in the mechanical frame of the main mirror.

In a conventional (Az/El) telescope system, the line of sight vector is mechanically static in the final output reference frame. In other words, the line of sight vector is along the bore sight of the (Az/El) telescope system. The illustrative embodiments address this issue successfully.

The illustrative embodiments have other advantages. For example, the use of the heliostatic output mirror for a sensing system may facilitate a significant weight reduction over a conventional gimbal mounted telescope. The illustrative embodiments also allow greater kinematic constraint of a telescope and associate optics. The illustrative embodiments also allow a stiffer mechanization structure to minimize structural dynamics. Accordingly, the illustrative embodiments may facilitate applications with higher acceleration profiles due to the stiffened structure.

In view of the above, and as further described below, the illustrative embodiments solves the conventional laser system acquisition, tracking, pointing and jitter rejection problem or associated image stabilization problem with a significant weight reduction so that the heliostat system may be utilized in high altitude, unmanned vehicles, or space-based applications. The illustrative embodiments may also be used in surveillance and electro optical tracking applications, such as image stabilization, launch tracking, target designation, and seeker head applications.

Figure 1:
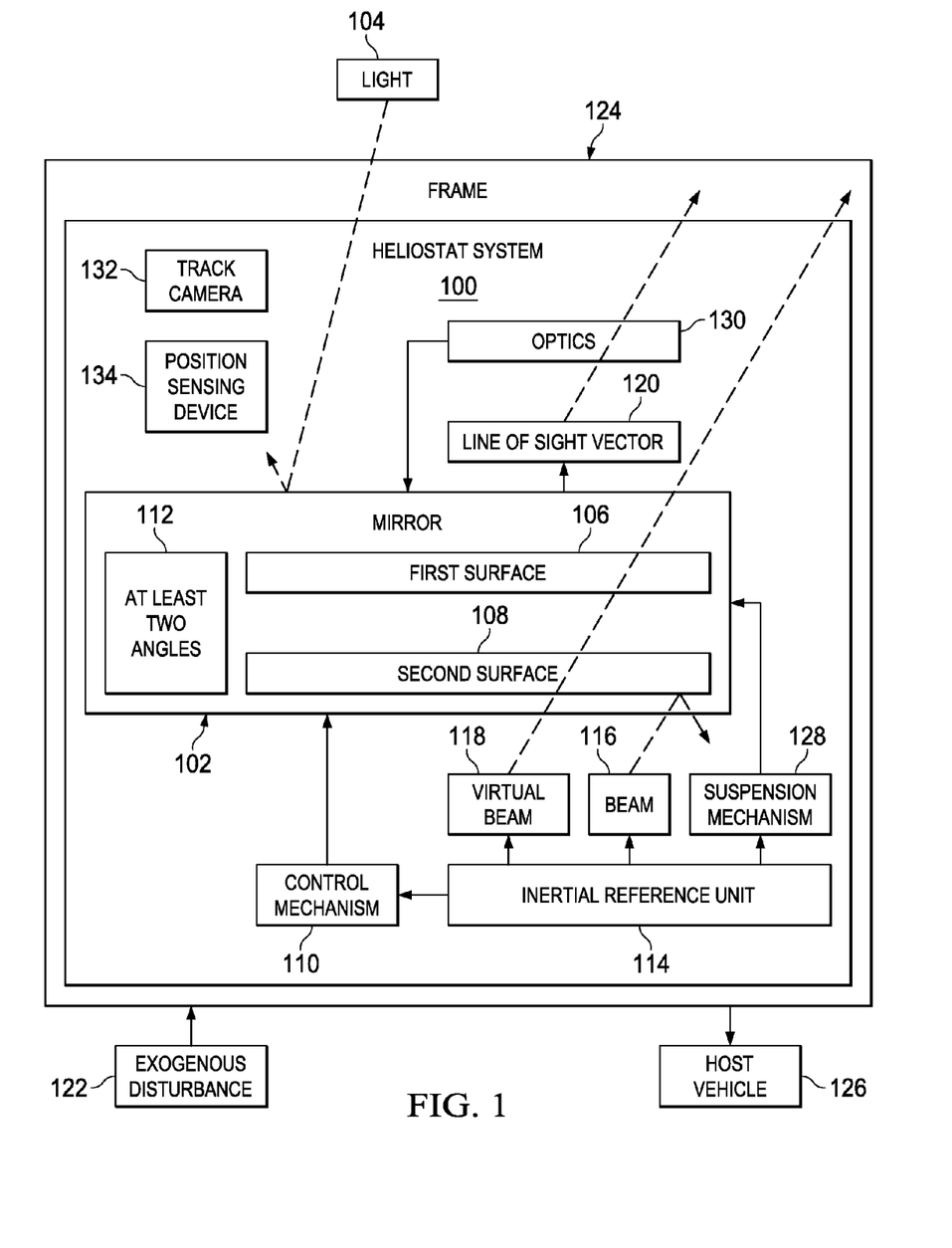
FIG. 1 is a block diagram of a heliostat system, in accordance with an illustrative embodiment.

FIG. 1 is a block diagram of a heliostat system, in accordance with an illustrative embodiment. Heliostat system 100 includes mirror 102. Mirror 102 may be configured to reflect light 104 directed towards first surface 106 of mirror 102. Light 104 may be external to heliostat system 100. First surface 106 may be opposite second surface 108 of mirror 102.

Heliostat system 100 may include control mechanism 110 connected to mirror 102. Control mechanism 110 may be configured to change at least two angles 112 of mirror 102. In an illustrative embodiment, control mechanism 110 may be a servo; however, control mechanism 110 may be any motor or physical driving device.

Heliostat system 100 also may include inertial reference unit 114 in communication with control mechanism 110. Inertial reference unit 114 may be configured to produce beam 116 and use beam 116 to optically sample second surface 108 of mirror 102. Beam 116 may at least reflect from second surface 108.

Control mechanism 110 may be configured to use data from beam 116 and inertial reference unit 114 to control at least two angles 112 such that virtual beam 118 from inertial reference unit 114 remains about co-aligned with line of sight vector 120 of mirror 102 when heliostat system 100 is subjected to exogenous disturbance 122. Virtual beam 118 may be an imaginary beam from inertial reference unit 114 that would have been present had beam 116 passed straight through mirror 102 instead of being reflected from second surface 108. Control mechanism 110 may use a computer, such as data processing system 600 of FIG. 6.

In an illustrative embodiment, heliostat system 100 may be mounted on frame 124. In turn, frame 124 may be mounted on host vehicle 126. In this case, or in any illustrative embodiment described herein, inertial reference unit 114 may be mounted to mirror 102 by suspension mechanism 128 having at least two degrees of freedom of movement with respect to mirror 102. Suspension mechanism 128 could be a servo, a gimbal, a spring, a shock absorber or any other mechanical device that allows the desired freedom of motion of inertial reference unit 114. By suspending inertial reference unit 114 from mirror 102, that jitter data arising from exogenous disturbance 122 may be modulated onto beam 116. This jitter data may arise from motion of host vehicle 126 in inertial space.

In an illustrative embodiment, optics 130 may be connected to mirror 102. Optics 130 may be set in an optical path shared by beam 116 and line of sight vector 120. Optics 130 may be configured to act as a beam expander towards track camera 132 mounted on frame 124 and position sensing device 134 mounted on frame 124.

Attention is now turned towards differences between known stabilization systems and the illustrative embodiments described above and elsewhere herein. These differences are presented solely to aid in understanding the claimed inventions, and are not necessarily limiting of the claimed inventions.

In a conventional laser system approach, where large space, weight, and power can be accommodated, an optical telescope is mounted on a gimbal that has two large angle degrees of freedom: Azimuth and Elevation (Az/El). This arrangement allows the input image and output laser beam or probe beam to be directed at a desired angle with respect to the host vehicle. Conventional systems address the problem of stabilization by gimbal mounting the optical telescope, thereby defining a coudé path.

These systems are relatively heavy due to the large amount of structure associated with the Beam Director Turret Assembly (BDTA) which eliminates them from consideration for high altitude, space based, or other low weight applications. These systems require an inertially stable reference beam originating in output space. Output space is the space that does not optically magnify or attenuate angles, and samples all optical elements along the target and imaging paths.

An inertial reference unit may be used to inertially stabilize a reference beam. The inertial reference unit is generally mounted on the back of the primary mirror cell and samples the telescope, coudé optics, all common path optics and, in conjunction with a Fast Steering Mirror (FSM), corrects outbound line of sight jitter by imposing a dynamic reciprocal of the inbound path.

Thus, the inertial reference unit (IRU) produces a beam that dynamically tracks the "inertial frame of reference" defined as a reference frame that is neither accelerating nor rotating. In this frame, a proof mass or inertia maintains its position and orientation in the frame without the application of a force or torque. The inertial reference unit produces this inertial frame employing a combination of isolated inertial sensors along with a servo control law and set of actuators to null the inertial sensors. Once nulled, the sensor reference frame is by definition inertial.

In a serial path, a passive suspension naturally attenuates high frequency vibrations due to the spring and mass characteristics of the suspension. The composite effect of these two paths is to produce an inertial reference frame that is defined by a vector physically collocated with the output of a collimated laser source that attenuates vibration disturbances imposed by the host vehicle.

Lower performance solutions to the problem of stabilization use a gyro-stabilized line of sight, pseudo strap down stabilized line of sight, or full strap down stabilized line of sight. The gyro-stabilized platform employs a rate sensing gyro and mechanically constrains the gyro axis and line of sight degrees of freedom to accomplish the appropriate stabilized line of sight kinematics.

The pseudo strap down approach uses a combination of base and mirror mounted gyros to partially instrument and satisfy the large angle mirror stabilization kinematic equations. The full strap down approach uses only a base mounted gyro and relative angle transducers on the mirror degree of freedom to enforce the line of sight stabilization and satisfy the large angle mirror stabilization kinematic equations.

The latter class of solutions does not accommodate the ultra-stable full line of sight stabilization that the illustrative embodiments allow. The latter class of solutions also suffer from feed-forward errors due to inertial sensor scale factor errors, alignment and orthogonality errors, and assumptions of structural rigidity of all associated beam transfer optics. Furthermore, the illustrative embodiments contemplate being used in small and compact systems, which do not allow for the distributed system architecture characterized by laser systems or advanced ISR systems. Still further, the prior solutions do not allow for application on extremely light weight vehicles that have low frequency structural modes, as exemplified by unmanned aerial vehicles (UAVs). Thus, the solutions used in laser targeting systems are not readily transferable to the illustrative embodiments described herein.

In contrast, the illustrative embodiments described herein solve the conventional laser system acquisition, tracking, pointing and jitter rejection problem or associated image stabilization problem with a significant weight reduction so that the stabilization system may be utilized in high altitude, unmanned aerial vehicle, or space-based applications. The illustrative embodiments may also be used in surveillance (ISR) and electro-optical tracking applications such as image stabilization, launch tracking, target designation, or seeker head applications.

Figure 2:
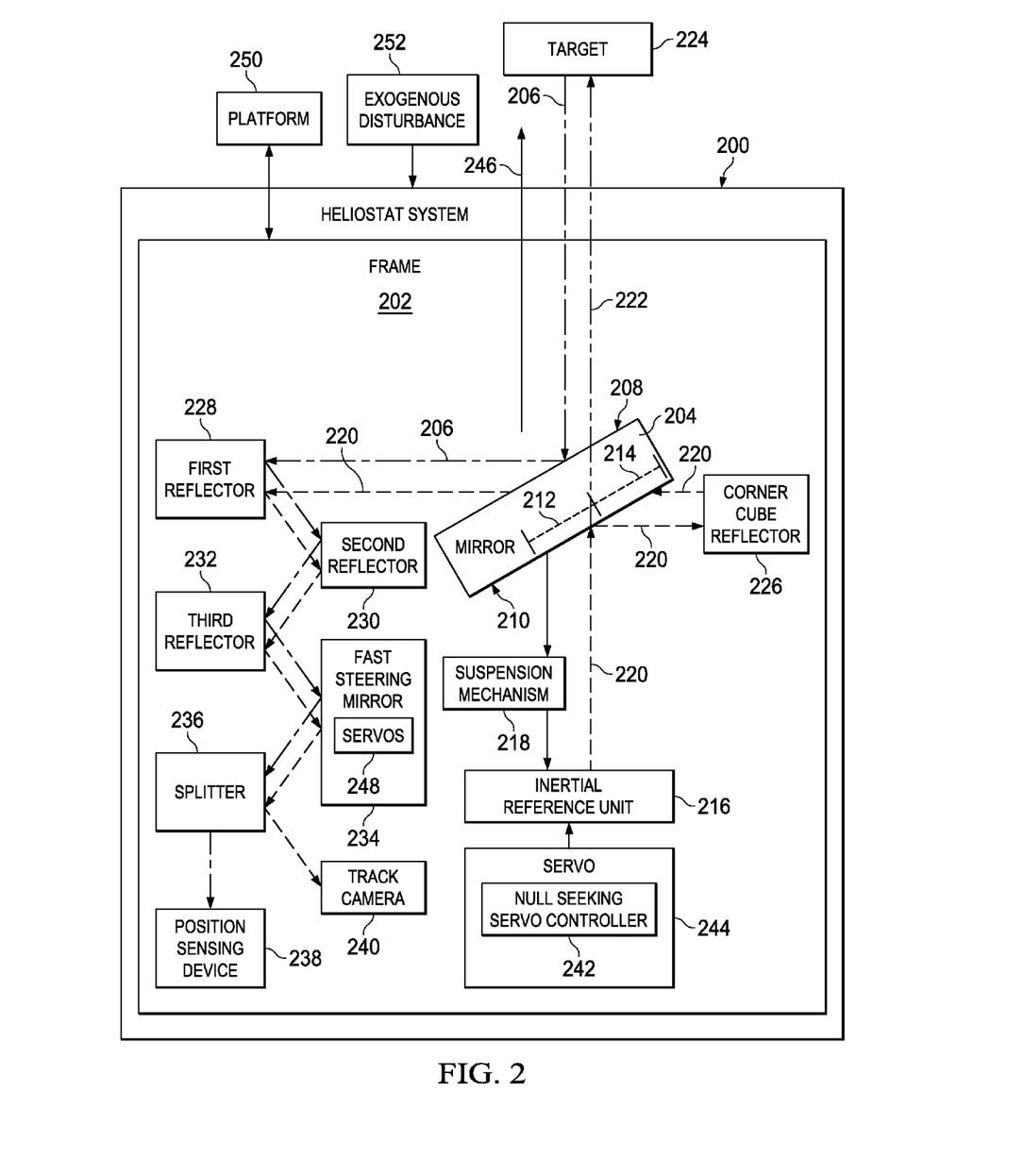
FIG. 2 is a block diagram of a heliostat system, in accordance with an illustrative embodiment.

FIG. 2 is a block diagram of a heliostat system, in accordance with an illustrative embodiment. Heliostat system 200 may be a different, more specific example of heliostat system 100 of FIG. 1. Other heliostat systems are possible.

Heliostat system 200 includes frame 202. Heliostat system 200 also includes mirror 204 connected to frame 202. Mirror 204 may be configured to reflect light 206 in a first frequency range that is directed towards first surface 208 of mirror 204. Light 206 is shown using different hash marking relative to other light paths in FIG. 2 in order to distinguish those light paths.

Light 206 may be external to heliostat system 200. First surface 208 may be opposite second surface 210 of mirror 204. Mirror 204 may further include first portion 212 of second surface 210 that is reflective with respect to a second frequency range different than the first frequency range. Mirror 204 further may include second portion 214 of second surface 210 that is about transparent to the second frequency range. Additionally, at least along a length about corresponding to second portion 214, first surface 208 may be about transparent to the second frequency range but about reflective in the first frequency range.

Figure 3:
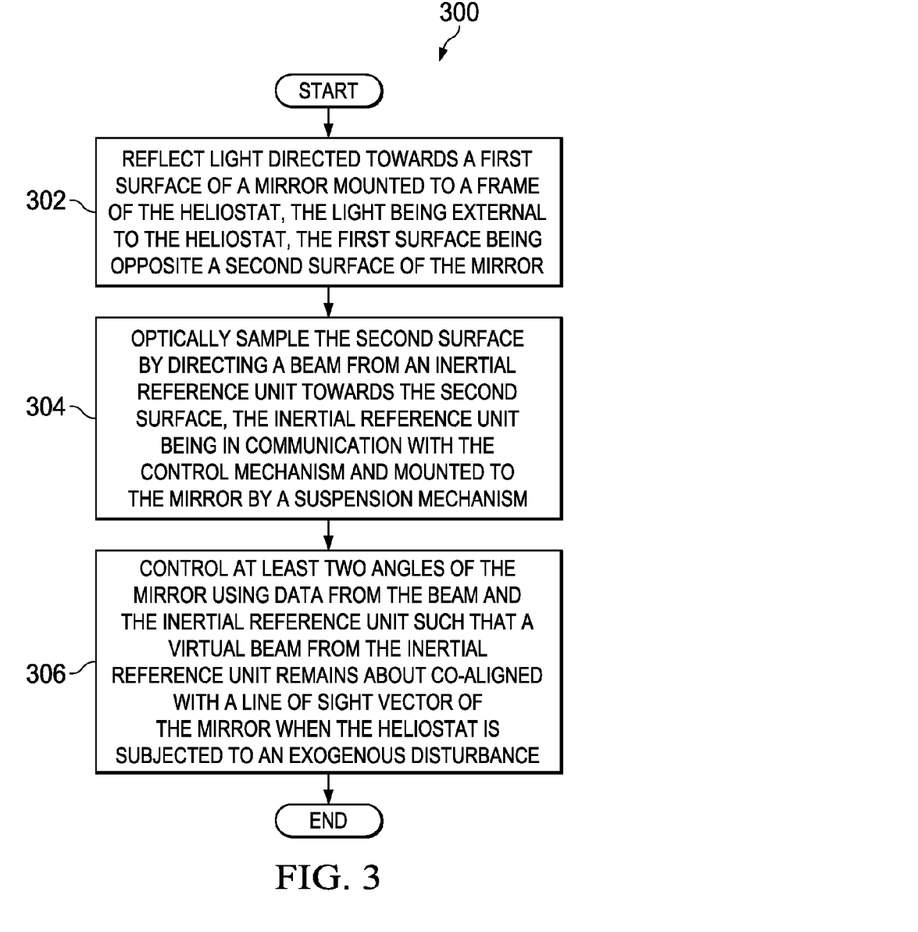
FIG. 3 is a flowchart of an operation of a heliostat system, in accordance with an illustrative embodiment.

The transmissive and reflective portions of mirror 204 may be varied. For example, the frequency ranges of these portions in which the mirror is reflective or transmissive may be varied. In another example, more or fewer reflective or transmissive portions may be added. In another example, an anti-reflective or absorbent coating may be added to some portion of mirror 204. Thus, the illustrative embodiments in FIG. 3 are not necessarily limiting of the claimed inventions.

Heliostat system 200 may also include inertial reference unit 216 connected to the mirror by suspension mechanism 218. Suspension mechanism 218 may be a spring, a gimbal system, or other mechanical attachment that allows inertial reference unit 216 to have at least two, and in some cases multiple, degrees of freedom of movement relative to mirror 204 and frame 202. Thus, for example, suspension mechanism 218 may be configured to allow inertial reference unit 216 to move in a first reference frame that is about inertial relative to a second reference frame of the mirror 204.

Inertial reference unit 216 may be further configured to direct beam 220 of light of the second frequency range towards first portion 212 of second surface 210. The angle of beam 220 relative to mirror 204 may be tracked or known. Specifically, tracking or knowing the angle of beam 220 may be expressed in terms of virtual beam 222 that is the same as beam 220, but which passed through mirror 204 instead of reflecting from first surface 210. In other words, inertial reference unit 216 may be configured to point virtual beam 222 towards target 224, wherein the virtual beam 222 is beam 220 had beam 220 not been reflected from second surface 210 of mirror 204. Virtual beam 222 uses a different hash pattern in FIG. 2 relative to beam 220, as virtual beam 222 does not actually exist.

In an illustrative embodiment, heliostat system 200 also includes corner cube reflector 226 connected to frame 202. Corner cube reflector 226 may be configured to receive beam 220 after being reflected from first portion 212. Corner cube reflector 226 may be further configured to reflect beam 220 back towards second portion 214 of second surface 210 of mirror 204.

Heliostat system 200 may also include first reflector 228. First reflector 228 may be connected to frame 202 and configured to receive beam 220 and light 206 after beam 220 and light 206 pass through second portion 214 of mirror 204.

Heliostat system 200 may also include second reflector 230 connected to frame 202 and configured to receive beam 220 and light 206 after beam 220 and light 206 reflects off of first reflector 228.

Heliostat system 200 also includes third reflector 232 connected to frame 202 and configured to receive beam 220 and light 206 after beam 220 and light 206 reflects off of second reflector 230.

In an illustrative embodiment, first reflector 228, second reflector 230, and third reflector 232 may be further configured to act as an expander from a smaller beam space to a larger beam space. Thus, these three reflectors may act as a telescope. In other illustrative embodiments, more, fewer, none of these three reflectors may be present.

Returning to FIG. 2, heliostat system 200 may also include fast steering mirror 234 (FSM 234) connected to frame 202. Fast steering mirror 234 may be configured to receive beam 220 and light 206 after beam 220 and light 206 reflects off of third reflector 232. Fast steering mirror 234, as well as any of the other optical components described herein, may be available from a number of vendors of optical parts.

Heliostat system 200 also may include splitter 236 connected to frame 202 and configured to receive beam 220 and light 206 after beam 220 and light 206 reflects off of fast steering mirror 24. Splitter 236 also may be configured to pass beam 220 but to reflect light 206.

Heliostat system 200 also may include position sensing device 238 connected to frame 202 and configured to receive beam 220 from splitter 236. Heliostat system 200 also may include track camera 240 connected to frame 202 and configured to receive light 206 from splitter 236 and to track target 224.

These illustrative embodiments may be varied. For example, splitter 236, or its coating, may be varied such that splitter 236 both reflects and passes portions of both light 206 and beam 220. Thus, portions of both light 206 and beam 220 may pass to both position sensing device 238 and track camera 240. Splitter 236 may be varied to have different optical characteristics, as well. Thus, the illustrative embodiment shown in FIG. 2 is not necessarily limiting of the claimed inventions.

Heliostat system 200 may be varied in other configurations. For example, in an illustrative embodiment, track camera 240 may be configured to recreate a spatial image of a target scene of mirror 204, and not just of target 224. In addition, track camera 240 may be further configured to allow a track algorithm to calculate a bi-direction conic centroidal direction of target 224 in the target scene with respect to a fiducial alignment reference based on beam 220.

In another illustrative embodiment, heliostat system 200 further may include null seeking servo controller 242 in communication with servo 244. Servo 244 may be connected to inertial reference unit 216. Null seeking servo controller 244 further may be in communication with mirror 204, position sensing device 238, track camera 240, and fast steering mirror 234. Null seeking servo controller 244 may use a computer, such as data processing system 600 of FIG. 6.

In this particular case, null seeking servo controller 242 may be further configured to point virtual beam 222 to target 224 and use a track error to attempt to null an error between target 224 and beam 220. In addition, null seeking servo controller 242 may be configured to cause line of sight vector 246 of mirror 204 to about coincide with virtual beam 222 by nulling a relative angle error of mirror 204.

Fast steering mirror 234 further may include one or more servos 248 configured to attempt to null beam 220 on position sensing device 238 and to imprint a dynamic reciprocal on line of sight vector 246 to null jitter induced errors in line of sight vector 246. In addition, line of sight vector 246 may dynamically coincide with virtual beam 222 while platform 250 to which frame 202 is attached executes general motion and target tracking, and while heliostat system 200 experiences exogenous disturbance 252. Exogenous disturbance 252 may also affect platform 250 or be a result of platform 250 moving.

Heliostat system 200 may have other configurations. For example, inertial reference unit 216 may be configured to use a combination of active and passive control to blend an inertially instrumented reference frame with a passive isolator arising from suspension dynamic characteristics of inertial reference unit 216 to produce beam 220 to be a reference substantially free of vibratory perturbations.

In another illustrative embodiment, inertial reference unit 216 may be configured to track line of sight vector 246 of mirror 204 as inertial reference unit 216 moves in an inertial frame of reference relative to mirror 204. In this case, a second line of sight vector of heliostat system 200 may be defined by about twice an elevation angle from frame 202 to a surface normal vector of mirror 204 and about an angle directly proportional to an azimuthal angle of mirror 204. In addition, line of sight vector 246 may be defined by exactly twice an elevation angle from frame 202 to a surface normal vector of mirror 204 and exactly an angle directly proportional to an azimuthal angle of mirror 204.

In yet another illustrative embodiment, beam 220 may be used to generate an inertial frame of reference defined as a reference frame that is neither accelerating nor rotating relative to inertial space in which the heliostat is moving. In this case, the inertial frame may be further defined by a vector co-located with an output of virtual beam 222. Additionally, the vector is configured to migrate in a mechanical frame of mirror 204.

As shown above, the illustrative embodiments shown in FIG. 2 may be varied. Thus, the descriptions provided above may be varied and are not necessarily limiting of the claimed inventions.

FIG. 3 is a flowchart of an operation of a heliostat system, in accordance with an illustrative embodiment. Method 300 may be implemented using a heliostat system, such as heliostat system 100 of FIG. 1 or heliostat system 200 of FIG. 2. Method 300 may be implemented in related heliostat systems, such as but not limited to heliostat system 400 of FIG. 4 or heliostat system 500 of FIG. 5. Method 300 may include, in part, use of a computer, such as data processing system 600 of FIG. 6.

In an illustrative embodiment, method 300 may begin by reflecting light directed towards a first surface of a mirror mounted to a frame of the heliostat, the light being external to the heliostat, the first surface being opposite a second surface of the mirror (operation 302). Next, method 300 may include optically sampling the second surface by directing a beam from an inertial reference unit towards the second surface, the inertial reference unit being in communication with the control mechanism and mounted to the mirror by a suspension mechanism (operation 304).

Method 300 also may include controlling at least two angles of the mirror using data from the beam and the inertial reference unit such that a virtual beam from the inertial reference unit remains about co-aligned with a line of sight vector of the mirror when the heliostat is subjected to an exogenous disturbance (operation 306). The virtual beam may be an imaginary beam from the inertial reference unit that would have been present had the beam passed straight through the mirror instead of being reflected. Method 300 may terminate thereafter.

The operations described above may be varied. For example, the operations need not necessarily be performed in the order given above. Additionally, more or fewer operations may be present. Still further, the illustrative embodiments contemplate methods of constructing any of the systems described in FIG. 1, FIG. 2, FIG. 4, and FIG. 5. Further still, the illustrative embodiments contemplate method of using any of the systems described in FIG. 1, FIG. 2, FIG. 4, and FIG. 5 to stabilize a line of sight vector of a mirror of a heliostat system using a beam and a virtual beam generated by an inertial reference unit. Thus, the claimed inventions are not necessarily limited by the process described with respect to FIG. 3.

Figure 4:
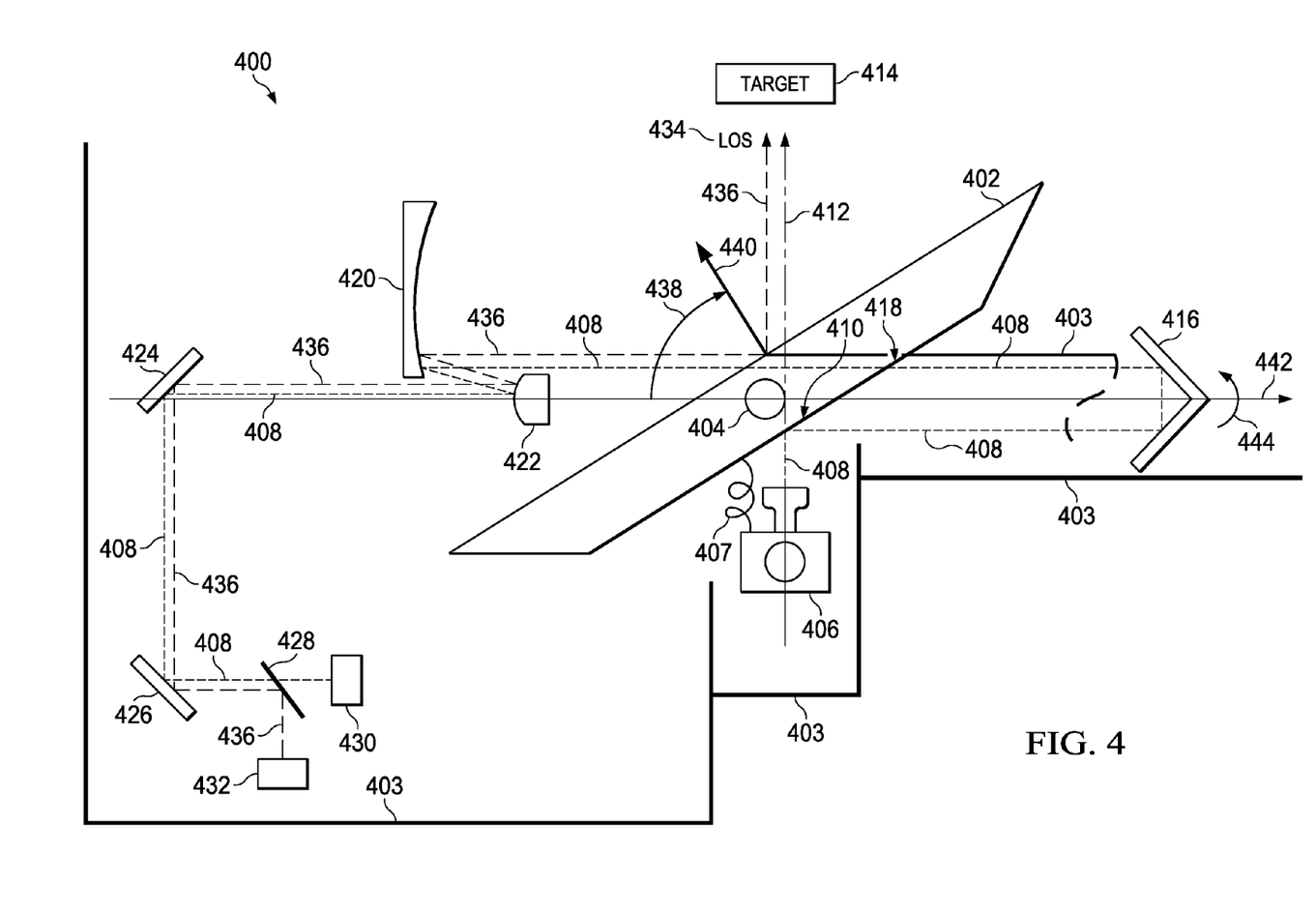
FIG. 4 is an illustration of a heliostat system, in accordance with an illustrative embodiment.

FIG. 4 is an illustration of a heliostat system, in accordance with an illustrative embodiment. Heliostat system 400 may be a specific example of a heliostat system, such as heliostat system 100 of FIG. 1 or heliostat system 200 of FIG. 2. Heliostat system 400 may be used to implement method 300 of FIG. 3.

Heliostat system 400 includes mirror 402 mounted to frame 403. Mirror 402 may pivot about at least one, preferably two, or even three axes using pivot mechanism 404 using a control mechanism described with respect to FIG. 5.

Frame 403 is shown in an abstract form in order to more clearly show the optical paths of heliostat system 400. Thus, frame 403 is not necessarily shown as being directly connected to each feature shown in FIG. 4. However, all optical components shown in FIG. 4 may be connected to frame 403, except for inertial reference unit 406.

Instead, inertial reference unit 406 may be connected to mirror 402 via suspension mechanism 407. Suspension mechanism 407 may be any suitable connector that allows inertial reference unit 406 to move independently of mirror 402 along at least one axis, preferably along two axes. Thus, suspension mechanism 407 may be a servo, a gimbal, a spring, a shock absorber or any other mechanical device that allows the desired freedom of motion of inertial reference unit 406. Suspension mechanism 407 may be a low frequency mounting or soft spring suspension, but may be configured to aid in the system nulling errors introduced by a common frequency range. In an illustrative embodiment, inertial reference unit 406 is not directly connected to frame 403, but rather only to mirror 402 via suspension mechanism 407. This independence of motion of inertial reference unit 406, in part, allows the stabilization of heliostat system 400, as described more fully with respect to FIG. 5.

Inertial reference unit 406 may direct beam 408 towards first portion 410 of mirror 402. Beam 408 may be a laser beam. Beam 408 may be generated at a first frequency. Inertial reference unit 406 may be pointed in a direction such that virtual beam 412 is directed towards target 414. Virtual beam 412 may be beam 408 had beam 408 not been reflected by mirror 402. Thus, while virtual beam 412 does not exist, virtual beam 412 serves as a reference for the direction in which inertial reference unit 406 points.

After being reflected from mirror 402, beam 408 strikes and is reflected from corner cube 416, which may be attached to frame 403. Corner cube 416 reflects beam 408 back towards second portion 418 of mirror 402. Second portion 418 of mirror 402 may be transparent or partially transparent to a first frequency of beam 408. Thus, beam 408 passes through mirror 402 via second portion 418 of mirror 402 and towards first mirror 420.

First mirror 420 reflects beam 408 towards second mirror 422. Second mirror 422 reflects beam 408 towards third mirror 424. Operating together, first mirror 420, second mirror 422, and third mirror 424 may act as a beam expander or telescope. Together, first mirror 420, second mirror 422, and third mirror 424 may be referred-to as a light expander system. This light expander system may include more or fewer mirrors. This light expander system may be entirely removed in an alternate illustrative embodiment by removing all three of these mirrors. In an illustrative embodiment, second mirror 422 may be movable to change a focus of the light expander system, though any mirror in this system may perform this function.

In the illustrative embodiment shown in FIG. 4, after reflecting from third mirror 424, beam 408 passes to fast steering mirror 426. Fast steering mirror 426 may be used for image motion control to stare at a scene while frame 403 moves and then rapidly repositions the line sight during a focal plane readout period. Fast steering mirror 426 may continuously correct for environmental disturbances such as air turbulence or vehicle vibrations. Fast steering mirror 426 may be any suitable fast steering mirror available from a variety of optical component vendors.

In an illustrative embodiment, after reflecting from fast steering mirror 426, beam 408 passes to splitter 428. In an illustrative embodiment, splitter 428 may be transparent to the frequency of beam 408. Thus, in this illustrative embodiment, beam 408 may pass to position sensing device 430. In other illustrative embodiment, splitter 428 may direct part of beam 408 to track camera 432, or splitter 428 may be entirely reflective and instead direct all of beam 408 to track camera 432.

Light from target 414 follows a path similar to beam 408 after beam 408 passes through mirror 402. This light from target 414 follows line of sight vector 434 of mirror 402. Line of sight vector 434 may be referred to as simply the line of sight of mirror 402, and may also be described by the acronym "LOS". Thus, line of sight vector 434 may be the direction from which light 436 is received from target 414.

Light 436 from target 414 reflects from mirror 40 towards first mirror 420. Light 436 then follows the same path as beam 408 to splitter 428. In an illustrative embodiment, splitter is configured to reflect light 436 towards track camera 432. Thus, in an illustrative embodiment, light 436 may be of a different frequency than beam 402. However, in other illustrative embodiments, light 436 may be of a same or similar frequency, in which case splitter 428 may also direct some or all of beam 408 towards track camera 432.

As mentioned above, pivot 404 may allow mirror 402 to pivot along both of two axes. Thus, mirror 402 may assume a variety of angles defined by elevation 438 relative to axis 442 and vector 440 which is normal or perpendicular to mirror 402. In addition, mirror may pivot along axis 442 as shown by arrow 444. Accordingly, mirror 402 may assume a variety of angles defined by an azimuth angle changed by rotating mirror 402 about axis 442 as shown by arrow 444.

Figure 5:
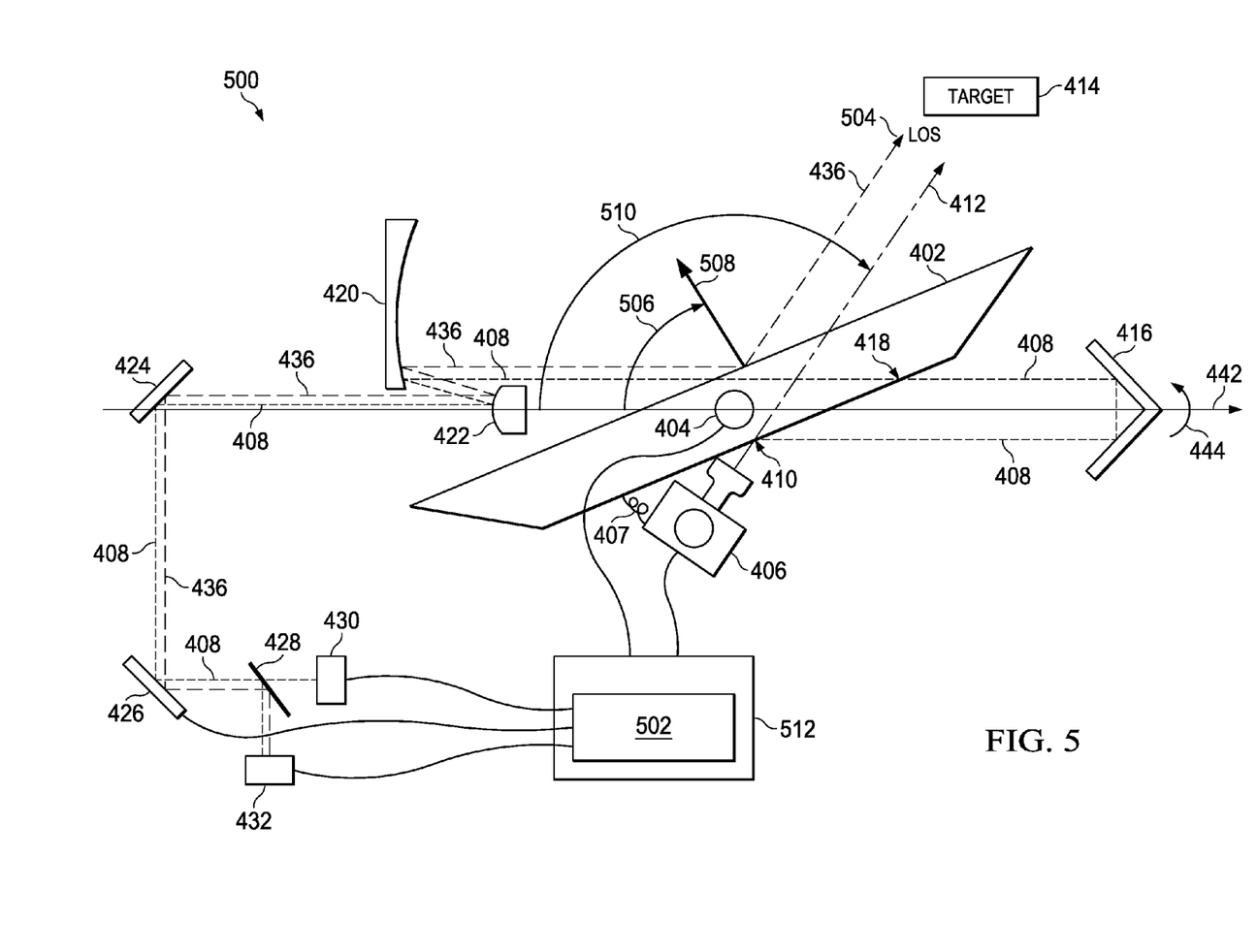
FIG. 5 is an illustration of a heliostat system in motion, in accordance with an illustrative embodiment.

In an illustrative embodiment, inertial reference unit 406 may be pointed towards target 414 by means of a control mechanism described with respect to FIG. 5. One relative angle error offloads to the azimuth angle. Another relative angle error offloads to an inertial reference unit large angle degree of freedom that offloads to drive the elevation angle towards Θ/2 where Θ is the angle of the IRU large angle degree of freedom. In an illustrative embodiment, heliostat system 400 may use, at least in part, a computer, such as data processing system 600 of FIG. 6.

FIG. 5 is an illustration of a heliostat system in motion, in accordance with an illustrative embodiment. Heliostat system 500 of FIG. 5 may be heliostat system 400 of FIG. 4 after having moved in order to track target 414. Thus, reference numerals common to FIG. 4 and FIG. 5 represent similar components and may have similar functions. Frame 403 shown in FIG. 4 has been removed from FIG. 5 in order to more clearly show components of heliostat system 500, though frame 403 may still be present. Alternatively, the components shown in either FIG. 4 or FIG. 5 may be attached directly to a host vehicle to which the heliostat system is attached.

In the illustrative embodiment shown in FIG. 5, mirror 402 has moved in order to continue tracking target 414. This movement may be accomplished in a stable manner by use of null seeking servo controller 502. Null seeking servo controller 502 may be connected to all of inertial reference unit 406, mirror 402 at pivot 404, fast steering mirror 426, position sensing device 430, and track camera 432. Null seeking servo controller 502 may be configured or programmed to move mirror 402 and inertial reference unit 406 such that both of these components point towards target 414. Thus, null seeking servo controller 502 helps ensure that line of sight 504 and virtual beam 412 both point towards target 414.

Null seeking servo controller 502 also is connected to position sensing device 430 and track camera 432. In this manner, null seeking servo controller 502 may receive feedback data from position sensing device 430 and track camera 432 and use this feedback data to control inertial reference unit 406 and mirror 402 to more accurately point towards target 414.

Due to the arrangement shown in FIG. 4 and FIG. 5, particularly because inertial reference unit 406 is connected only to mirror 402 via suspension mechanism 407, beam 408 is stable in an inertial reference frame. Accordingly, beam 408 may be referred-to as an inertial reference beam. Beam 408 is substantially free of exogenous vibrations or disturbances that may otherwise dramatic limit the accuracy of how closely and constantly mirror 402 may point directly at target 414.

Additionally, beam 408 contains information on the tilt and motions of the remaining optics along the path of beam 408. Each particular error introduced by the vibrations of a corresponding optical component along the path of beam 408 is superimposed upon the particular error introduced by the vibrations of a prior optical component along the path of beam 408. In total, this information may be used by null seeking servo controller 502 to aid in nulling the total errors in heliostat system 500.

Specifically, beam 408 may be zeroed dynamically on position sensing device 430 using fast steering mirror 426. As a result, beam 408 may track every intermediate portion of beam tilt information so that when the output of position sensing device is stable the resultant outgoing vector (line of sight 504) is inertially stable. Furthermore, line of sight 504 is statically aligned with virtual beam 412. Note that line of sight 504 may be referred to as a line of sight vector. Accordingly, in this manner described above, virtual beam 412 from inertial reference unit 406 may remain about co-aligned with line of sight 504 of mirror 402 when heliostat system 500 is subjected to an exogenous disturbance.

Stated differently, inertial reference unit 406 may be configured to use a combination of active and passive control to blend an inertially instrumented reference frame with a passive isolator arising from suspension dynamic characteristics of the inertial reference unit to produce beam 408 to be a reference substantially free of vibratory perturbations. Inertial reference unit 406 may be configured to track line of sight vector 434 of mirror 402 as inertial reference unit 406 moves in an inertial frame of reference relative to mirror 402.

In addition, line of sight 504 may be referred to as a second line of sight vector, relative to line of sight vector 434 shown in FIG. 4, because line of sight vector 434 of mirror 402 has moved in order to track moving target 414. This second line of sight vector of heliostat system 500 may be defined by about twice elevation angle 506 from frame 403 to surface normal vector 508 of mirror 402 (as shown by angle 510), and by about an angle directly proportional to an azimuthal angle 444 of mirror 402.

Additionally, line of sight 504 (the line of sight vector) may be defined by exactly twice elevation angle 506 from frame 403 to surface normal vector 508 of mirror 402 and exactly an angle directly proportional to an azimuthal angle 444 of mirror 402.

The illustrative embodiments may be varied or described in different ways. For example, the following may be alternative approaches to describing the nature and functions of some of the above components.

An inertial reference unit, such as inertial reference unit 406, may use a combination of active and passive control to blend an inertially instrumented reference frame with a passive isolator arising from the suspension dynamic characteristics to produce a laser reference free of vibratory perturbations. The inertial reference unit may have a large angle degree of freedom. This degree of freedom allows the inertial reference unit to track the line of sight of the mirror as it moves in the output mirror frame.

The mirror, such as mirror 402, may be referred to as a heliostat mirror. This mirror may be a large turning mirror that rotates about an axis perpendicular to the plane of the page of FIG. 5 (the elevation) and parallel to the plane of the page of FIG. 5 (the azimuth). The azimuth degree of freedom may rotate the axis of the elevation degree of freedom.

A corner cube may be an optic used to reflect the inertial reference unit beam at the same vector angle as the arriving vector angle. This feature allows the two vectors to be dynamically equivalent.

A line of sight vector may be a vector defined by twice the angle from the bench or frame to the mirror normal vector, which is always perpendicular to the mirror. The line of sight vector can be calculated by rotating the input vector by 180 degrees about the surface normal vector.

A virtual beam may be the beam that would have propagated from the inertial reference unit if the real beam had transmitted unaffected through the mirror. In the illustrative embodiments described herein, only a single real beam is transmitted from the inertial reference unit, and this beam remains within the confines of the heliostat system, such as heliostat system 100, heliostat system 200, heliostat system 400, or heliostat system 500. In other illustrative embodiments, multiple beams or multiple inertial reference units may be present.

A fast steering mirror may be mirror that allows the high bandwidth imposition of the reciprocal beam path disturbances. Such a fast steering mirror is available from a variety of optical vendors.

A position sensing device is a device which may produces a high bandwidth DC-1000Hz measurement of the bi-directional conic angle of the reference beam (the beam generated by the inertial reference unit). The position sensing device may be configured to perform measurements in other bandwidths or other frequencies or frequency types.

A track camera may be a device to re-create the spatial image of the target scene which includes the target, such as target 414. The track camera may allow a track algorithm to calculate a bi-direction conic centroidal direction of the target relative to the heliostat system. The track algorithm may be executed using a processor in communication with null seeking servo controller 502, such as processor 512, and may take the form of a non-transitory computer readable storage medium. This algorithm may be used by a null seeking servo controller, such as null seeking servo controller 502, to also point the virtual beam towards the target. Recall that the beam from the inertial reference unit is inertially stable. Accordingly, in combination with the former sentence, it may be said that the line of sight (or line of sight vector) of the mirror is inertially stable. Processor 512 may be part of a data processing system, such as data processing system 600 of FIG. 6.

As a result, it may be said that the line of sight vector migrates in the mechanical frame of the mirror. This feature of the illustrative embodiments stands in contrast with conventional tracking systems in which the line of sight vector is mechanically static in the final output reference frame, specifically mechanically static along the bore sight of the system. Because the illustrative embodiments establish the line of sight vector to migrate in the mechanical frame of the mirror, the illustrative embodiments provide a heliostat system that is substantially more stable and accurate than conventional laser tracking systems. The illustrative embodiments also require fewer and lighter components than convention systems, and thus are significantly lighter than conventional systems.

The illustrative embodiments described with respect to FIG. 5 may be varied. For example, more or fewer optics may be present in the expander system composed of first mirror 420, second mirror 422, and third mirror 424 shown in FIG. 5. More or fewer inertial reference units and more or fewer inertial reference unit beams may be present. Corner cube 416 may be replaced with a series of separate reflectors that reflect beam 408 towards second portion 418 of mirror 402. Many other variations are possible; thus, the illustrative embodiments described with respect to FIG. 5 are not necessarily limiting of the claimed inventions.

Figure 6:
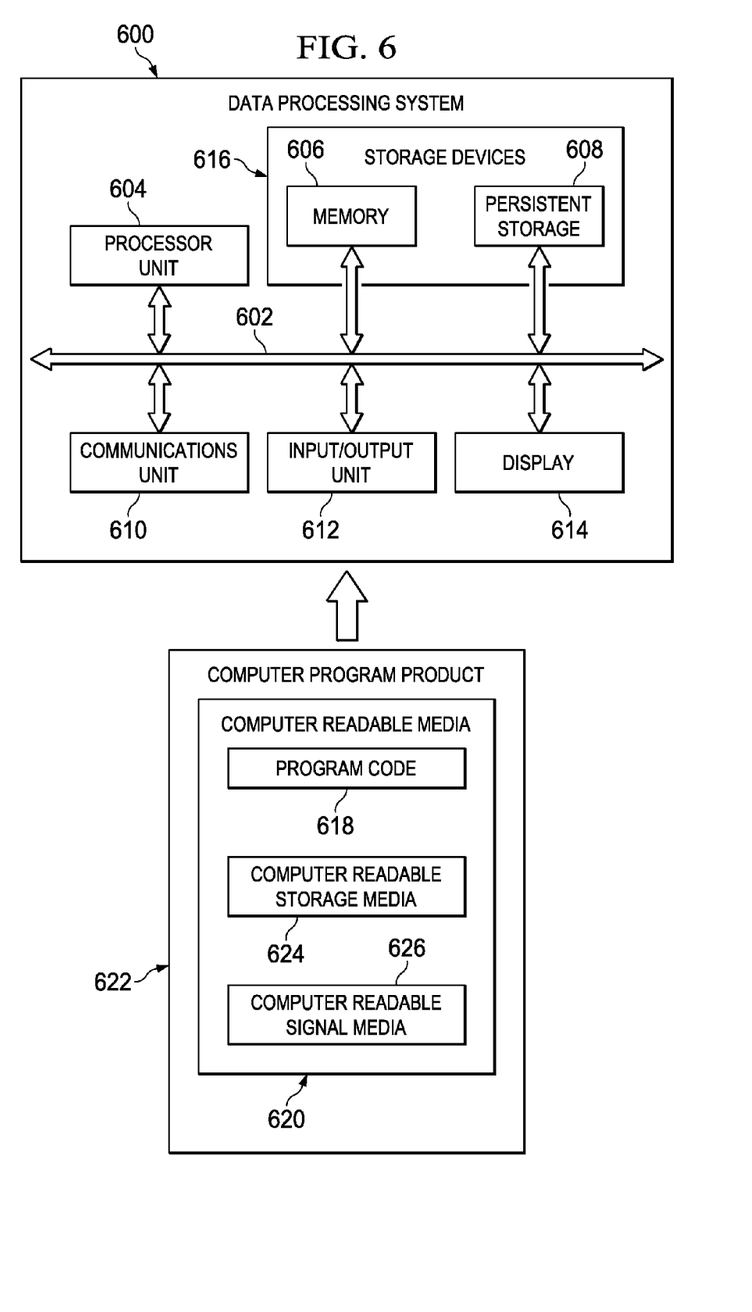
FIG. 6 is a block diagram of a data processing system, in accordance with an illustrative embodiment.

Turning now to FIG. 6, an illustration of a data processing system is depicted in accordance with an illustrative embodiment. Data processing system 600 in FIG. 6 is an example of a data processing system that may be used to implement the illustrative embodiments, such as processor 512 of FIG. 5, or any other computer process disclosed herein. In this illustrative example, data processing system 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a number of processors, a multi-processor core, or some other type of processor, depending on the particular implementation. A number, as used herein with reference to an item, means one or more items. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output (I/O) unit 612 allows for input and output of data with other devices that may be connected to data processing system 600. For example, input/output (I/O) unit 612 may provide a connection for user input through a keyboard, a mouse, and/or some other suitable input device. Further, input/output (I/O) unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 for execution by processor unit 604. The processes of the different embodiments may be performed by processor unit 604 using computer implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Computer readable media 620 may be referred-to as a non-transitory computer readable storage medium. Program code 618 and computer readable media 620 form computer program product 622 in these examples. In one example, computer readable media 620 may be computer readable storage media 624 or computer readable signal media 626. Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600. In some instances, computer readable storage media 624 may not be removable from data processing system 600.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 618 may be omitted because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

As another example, a storage device in data processing system 600 is any hardware apparatus that may store data. Memory 705, persistent storage 608, and computer readable media 620 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 705, or a cache, such as found in an interface and memory controller hub that may be present in communications fabric 602.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A heliostat system comprising:
a mirror configured to reflect light directed towards a first surface of the mirror, the light being external to the heliostat system, the first surface being opposite a second surface of the mirror;
a control mechanism connected to the mirror and configured to change at least two angles of the mirror;
an inertial reference unit in communication with the control mechanism and configured to produce a beam and use the beam to optically sample the second surface of the mirror, the beam at least reflecting from the second surface, wherein the control mechanism is configured to use data from the beam and the inertial reference unit to control the least two angles such that a virtual beam from the inertial reference unit remains about co-aligned with a line of sight vector of the mirror when the heliostat system is subjected to an exogenous disturbance, the virtual beam comprising an imaginary beam from the inertial reference unit that would have been present had the beam passed straight through the mirror instead of being reflected.

2. The heliostat system of claim 1, wherein the control mechanism comprises a servo.

3. The heliostat system of claim 1, wherein the heliostat system is mounted on a frame and the frame is mounted on a host vehicle, and wherein the inertial reference unit is mounted to the mirror by a suspension mechanism having at least two degrees of freedom of movement with respect to the mirror, such that jitter data arising from the exogenous disturbance is modulated onto the beam, and wherein the jitter data arises from motion of the host vehicle in inertial space.

4. The heliostat system of claim 3 further comprising:
optics connected to the mirror and in an optical path shared by the beam and the line of sight vector, the optics configured to act as a beam expander towards a track camera mounted on the frame and a position sensing device mounted on the frame.

5. A heliostat system comprising:
a frame;
a mirror connected to the frame and configured to reflect light in a first frequency range that is directed towards a first surface of the mirror, the light being external to the heliostat system, the first surface being opposite a second surface of the mirror, the mirror further including a first portion of the second surface that is reflective with respect to a second frequency range different than the first frequency range, the mirror further including a second portion of the second surface that is about transparent to the second frequency range, and further wherein the first surface is about transparent to the second frequency range but about reflective in the first frequency range;
an inertial reference unit connected the mirror by a suspension mechanism that allows the inertial reference unit to move in a first reference frame that is about inertial relative to a second reference frame of the mirror, the inertial reference unit further configured to direct a beam of light of the second frequency range towards the first portion of second surface, the inertial reference unit configured to point a virtual beam towards a target, the virtual beam comprising the beam had the beam not been reflected from the second surface;
a corner cube reflector connected to the frame and configured to receive the beam after being reflected from the first portion, the corner cube reflector further configured to reflect the beam back towards the second portion of the second surface;
a first reflector connected to the frame and configured to receive the beam and the light after the beam and the light passes through the mirror;
a second reflector connected to the frame and configured to receive the beam and the light after the beam and the light reflects off of the first reflector;
a third reflector connected to the frame and configured to receive the beam and the light after the beam and the light reflects off of the second reflector, and wherein the first reflector, second reflector, and third reflector are further configured to act as an expander from a smaller beam space to a larger beam space;
a fast steering mirror connected to the frame and configured to receive the beam and the light after the beam and the light reflects off of the third reflector;
a splitter connected to the frame and configured to receive the beam and the light after the beam and the light reflects off of the fast steering mirror, the splitter also configured to pass the beam but to reflect the light;
a position sensing device connected to the frame and configured to receive the beam from the splitter; and
a track camera connected to the frame and configured to receive the light from the splitter and to track the target.

6. The heliostat system of claim 5, wherein the track camera is configured to recreate a spatial image of a target scene of the mirror.

7. The heliostat system of claim 6, wherein the track camera is further configured to allow a track algorithm to calculate a bi-direction conic centroidal direction of a target in the target scene with respect to a fiducial alignment reference based on the beam.

8. The heliostat system of claim 5 further comprising a null seeking servo controller in communication with a servo, the servo connected to the inertial reference unit, the null seeking servo controller further in communication with the mirror, the position sensing device, the track camera, and the fast steering mirror.

9. The heliostat system of claim 8, wherein the null seeking servo controller is further configured to point the virtual beam to the target and use a track error to attempt to null an error between the target and the beam.

10. The heliostat system of claim 8, wherein the null seeking servo controller is configured to cause a line of sight vector of the mirror to about coincide with the virtual beam by nulling a relative angle error of the mirror.

11. The heliostat system of claim 10, wherein the fast steering mirror further comprises one or more servos configured to attempt to null the beam on the position sensing device and to imprint a dynamic reciprocal on the line of sight vector to null jitter induced errors in the line of sight vector.

12. The heliostat system of claim 10, wherein the line of sight vector dynamically coincides with the virtual beam while a platform to which the frame is attached executes general motion and target tracking, and while the heliostat experiences an exogenous disturbance.

13. The heliostat system of claim 5, wherein the inertial reference unit is configured to use a combination of active and passive control to blend an inertially instrumented reference frame with a passive isolator arising from suspension dynamic characteristics of the inertial reference unit to produce the beam to be a reference substantially free of vibratory perturbations.

14. The heliostat system of claim 5, wherein the inertial reference unit is configured to track a line of sight vector of the mirror as the inertial reference unit moves in an inertial frame of reference relative to the mirror.

15. The heliostat system of claim 14, wherein a second line of sight vector of the heliostat system is defined by about twice an elevation angle from the frame to a surface normal vector of the mirror and about an angle directly proportional to an azimuthal angle of the mirror.

16. The heliostat system of claim 14, wherein the line of sight vector is defined by exactly twice an elevation angle from the frame to a surface normal vector of the mirror and exactly an angle directly proportional to an azimuthal angle of the mirror.

17. The heliostat system of claim 5, wherein the beam is used to generate an inertial frame of reference defined as a reference frame that is neither accelerating nor rotating relative to inertial space in which the heliostat is moving.

18. The heliostat system of claim 17, wherein the inertial frame is further defined by a vector co-located with an output of the virtual beam.

19. The heliostat system of claim 18, wherein the vector is configured to migrate in a mechanical frame of the mirror.

20. A method executed in a heliostat, the method comprising:
    reflecting light directed towards a first surface of a mirror mounted to a frame of the heliostat, the light being external to the heliostat, the first surface being opposite a second surface of the mirror;
    optically sampling the second surface by directing a beam from an inertial reference unit towards the second surface, the inertial reference unit being in communication with a control mechanism and mounted to the mirror by a suspension mechanism; and
    controlling at least two angles of the mirror using data from the beam and the inertial reference unit such that a virtual beam from the inertial reference unit remains about co-aligned with a line of sight vector of the mirror when the heliostat is subjected to an exogenous disturbance, the virtual beam comprising an imaginary beam from the inertial reference unit that would have been present had the beam passed straight through the mirror instead of being reflected.

* * * * *